United States Patent [19]

Sugiura et al.

[11] Patent Number: 4,583,091

[45] Date of Patent: Apr. 15, 1986

[54] SERIAL SIGNAL TRANSMISSION SYSTEM

[75] Inventors: Hiroaki Sugiura, Fuji, Japan; Yoshihito Mino, Shizuoka, both of Japan

[73] Assignee: Tokyo Shibaura Denki Kabushiki Kaisha, Kanagawa, Japan

[21] Appl. No.: 436,363

[22] Filed: Oct. 25, 1982

[30] Foreign Application Priority Data

Oct. 31, 1981 [JP] Japan .................... 56-175157

[51] Int. Cl.⁴ .................................. G08C 19/00
[52] U.S. Cl. ........................ 340/825.59; 307/138
[58] Field of Search ............................. 307/127, 138; 340/825.59; 318/312; 361/3

[56] References Cited

U.S. PATENT DOCUMENTS

| | | | |
|---|---|---|---|
| 3,514,543 | 5/1970 | Rae | 307/127 |
| 3,783,354 | 1/1974 | Fletcher et al. | 307/127 X |
| 3,953,776 | 4/1976 | Wolf | 318/312 |
| 4,153,922 | 5/1979 | Azuma et al. | 307/138 X |

Primary Examiner—Ulysses Weldon
Attorney, Agent, or Firm—Stevens, Davis, Miller & Mosher

[57] ABSTRACT

In a serial signal transmission system for transmitting data signals in a serial manner from a transmitting part to a receiving part of the system, both supplied power from a common power source, are provided a signal line extended between the two parts, a device for detecting the polarity of the power source voltage, a device for generating binary pulses in response to the output of the polarity detecting device, and a control element provided in the signal line. The control element is made conductive in accordance with the binary pulses constituting the data signals.

6 Claims, 9 Drawing Figures

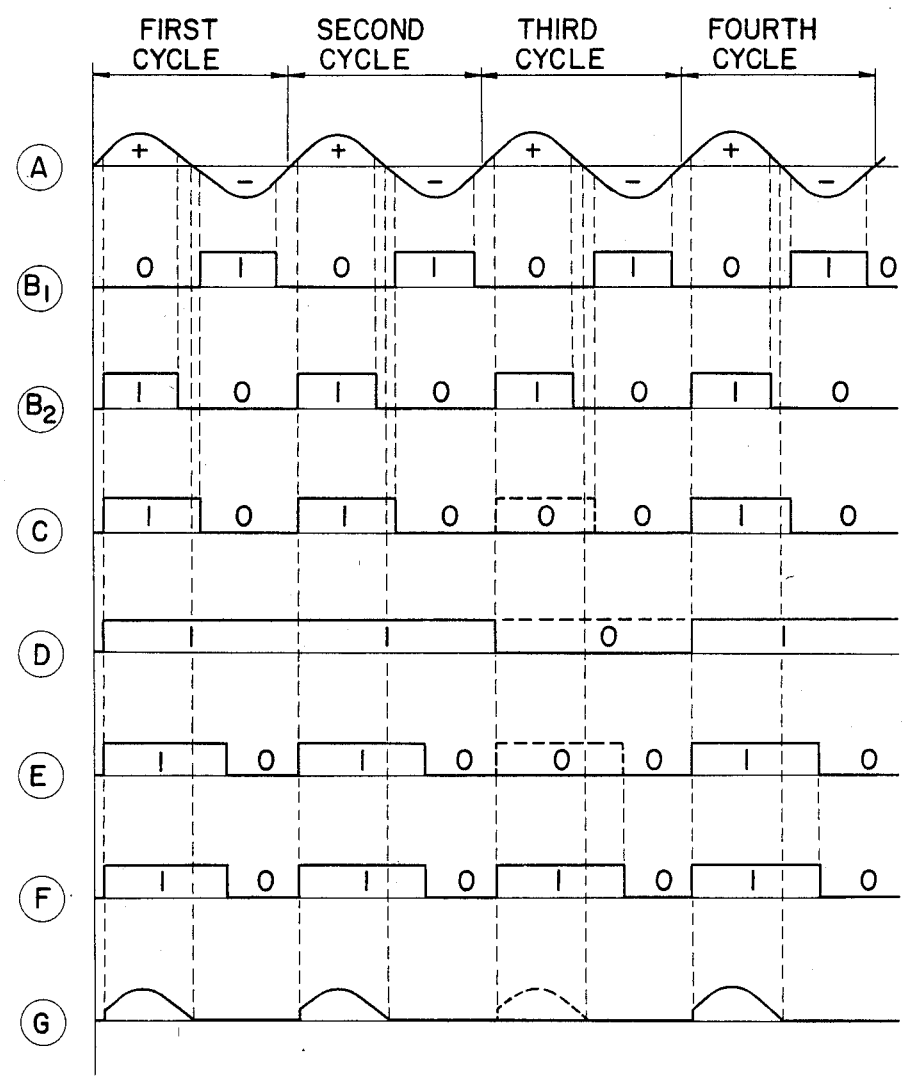

SERIAL SIGNAL TRANSMISSION SYSTEM

BACKGROUND OF THE INVENTION

This invention relates to a digital signal transmission system, and more particularly to a serial signal transmission system.

For instance, in a split type air conditioning apparatus, data required for the operation of the apparatus are transmitted between an indoor unit and an out-door unit of the apparatus. Since the amount of data to be transmitted in this case is not much, and the economization in the number of signal lines is mandatory, serial signal transmission systems as shown in FIGS. 1 and 2 have been heretofore proposed.

In the system shown in FIG. 1, signal transmission lines $L_3$ and $L_4$ are provided separately from AC power supply lines $L_1$ and $L_2$ between a transmitting circuit and a receiving circuit of the system. Serial signals generated in a serial signal generating device 1 in the transmitting circuit of the system are transmitted from a serial signal transmitting device 3 also provided in the transmitting circuit through the signal transmission lines $L_3$ and $L_4$ to a serial signal receiving device 4 and a serial signal discriminating device 2 both provided in the receiving circuit.

On the other hand, in the system shown in FIG. 2, the power supply lines $L_1$ and $L_2$ are utilized for transmitting signals. That is, the serial signals generated in the serial signal generating device 1 in the system shown in FIG. 2 are modulated, for instance, in the serial signal transmitting device 3, and then transmitted through the power supply lines $L_1$ and $L_2$ to the serial signal receiving device 4 to be demodulated therein.

Although the circuit shown in FIG. 2 is advantageous because the signal transmission lines $L_3$ and $L_4$ are omitted, it requires complicated modulation and demodulation circuits.

For eliminating this disadvantage, there has been proposed another system as shown in FIG. 3 wherein a signal transmission line $L_3$ is provided between the signal transmitting circuit and the signal receiving circuit of the system, and each of the positive half cycles of the power source voltage is utilized as one bit of the serial signals to be transmitted from the transmitting circuit to the receiving circuit of the system.

Although the system shown in FIG. 3 is advantageous in that it requires only a single signal transmission line without requiring modulation and demodulation of the signals, the instants at which the serial signal generating device 1 of this system generates serial signals are those when one of the power source lines ($L_1$ in the example shown) connected to the device 1 becomes positive, and therefore any erroneous connection of the device 1 to the power source line has rendered the system utterly inoperative.

SUMMARY OF THE INVENTION

A primary object of the present invention is to provide a serial signal transmission system wherein the above described disadvantages of the conventional systems can be substantially eliminated.

Another object of the invention is to provide a serial signal transmission system wherein half cycles of, for instance, a positive polarity of an AC voltage are utilized as individual bits of the serial signals to be transmitted by the transmission system.

These and other objects of the present invention can be achieved by a serial signal transmission system capable of transmitting serial signals between a transmitting part and a receiving part of the system, both parts being supplied power from a commonly provided power source, characterized in that a signal line is extended from the transmitting part to the receiving part of the system so that an end thereof in the transmitting part is connected to a first line of the power source, while the other end in the receiving part of the line is connected to a second line of the power source, the transmitting part of the system comprises means for detecting the polarity of the power source voltage, means responsive to the output of the polarity detecting means for generating binary pulses, each having a duration ranging from one polarity time to the other polarity time of the power source voltage, and a control element which is provided in the signal line to change its operative condition upon reception of the binary pulses and thereby to transmit the binary pulses in a serial manner to the receiving part of the transmission system. The control element may be a photothyristor contained in a photocoupler together with a luminous diode which receives the output pulses of the pulse generating means.

BRIEF DESCRIPTION OF THE DRAWINGS

The invention will be described in detail with reference to the accompanying drawings, in which:

FIG. 9 is a diagram showing waveforms of signals delivered from various members of the embodiment shown in FIG. 8.

DESCRIPTION OF THE PREFERRED EMBODIMENTS

Figure 1:
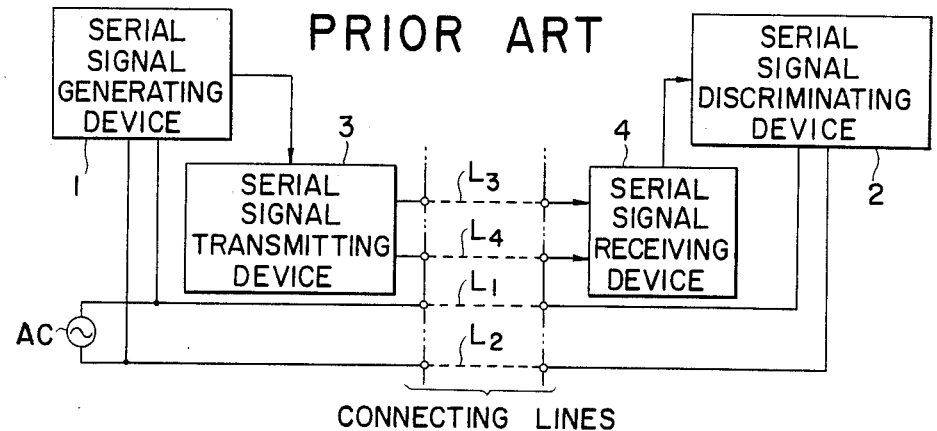
FIGS. 1 and 2 are connection diagrams showing conventional serial signal transmission systems, respectively.
Figure 2:
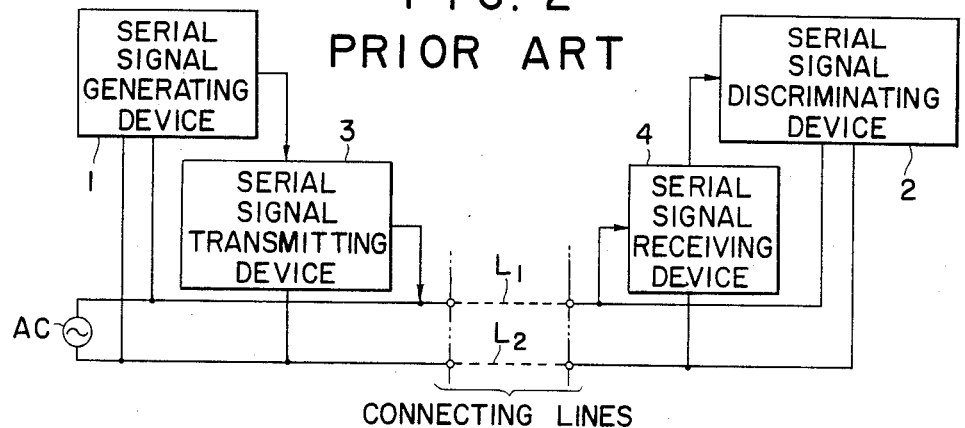
Figure 3:
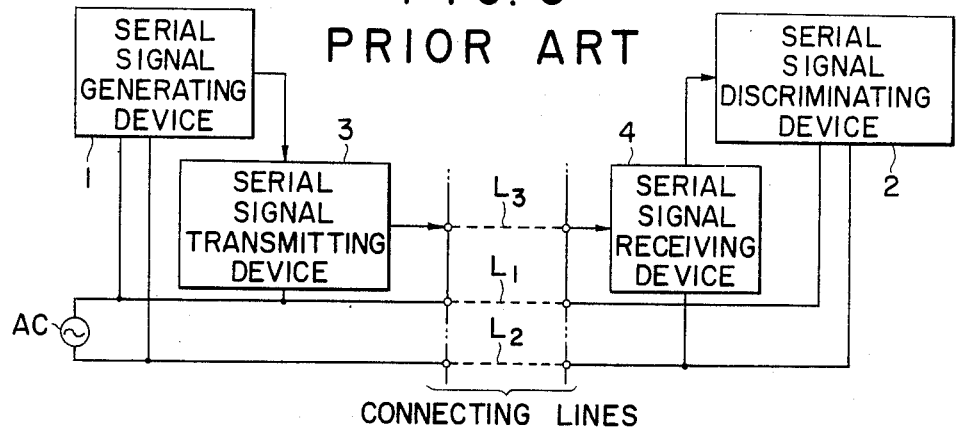
FIG. 3 is a connection diagram showing still another conventional serial signal transmission system wherein one of the power source lines is used as a signal transmission line.
Figure 4:
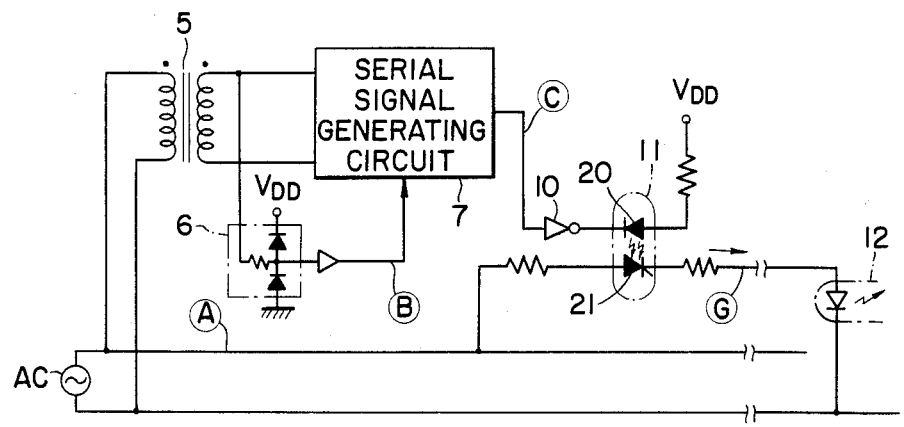
FIG. 4 is a connection diagram showing a preferred embodiment of the present invention.

FIG. 4 illustrates a serial signal transmission system constituting a preferred embodiment of the present invention, the system having a transmitting circuit wherein a signal picked up by a polarity detecting circuit 6 from the secondary winding of a transformer 5 connected across an AC power source AC is applied to a serial signal generating circuit 7 which generates binary pulses each time one of the two power source lines becomes positive. One example of a known serial signal generating circuit 7 is disclosed in FIG. 1 of Japanese Laid Open Patent Specification No. 103554/1981 published Aug. 18, 1981. Briefly stated, it comprises a counter counting a number of serial signals for producing sequential counts having alternate "1" and "0" levels, a number of NAND gate circuits alternately inputted with "1" and "0" outputs and parallel information data. The "1" and "0" outputs are used as sampling singals which detect the parallel information data at different timings. The outputs of the NAND gate circuits are inputted to another NAND gate circuit to generate a serial signal corresponding to the parallel information data. As shown in FIG. 4, the polarity detecting circuit 6 comprises a pair of serially connected diodes, with one end grounded and the other end connected to a source of reference DC potential $V_{DD}$. The junction between the diodes is connected, on one hand, to one terminal of the secondary winding of transformer 5 and, on the other hand, to the serial signal generating circuit 7 through a rectifier. Consequently, each time the positive half cycle of the secondary voltage exceeds the reference potential, an output B is supplied to the serial signal generating circuit 7, as shown by curve B in FIG. 5. For the reason described hereinafter, each binary pulse has a pulse width longer than a half cycle of the power source voltage. More specifically, the pulse starts while one of the power source lines is held positive and terminates when the voltage of the power source lines becomes negative.

The polarity of the binary pulses is inverted by an inverter 10, the output of the inverter 10 being applied to a luminous diode 20 of a photocoupler 11 to be converted into an optical signal that is applied to a photothyristor 21 of the coupler 11. The photothyristor 21 has an anode connected to one line of the power source and a cathode connected through a luminous diode 12 to the other line of the power source. Accordingly, an optical output having a duration shorter than one half cycle of the power source voltage is delivered from the luminous diode 12 which is provided in the receiving circuit of the transmission system.

Figure 5:
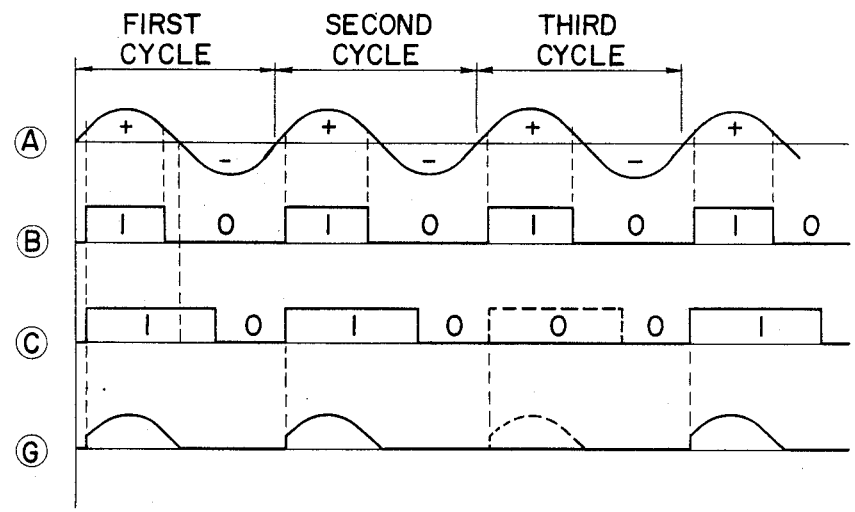
FIG. 5 is a diagram showing waveforms of signals delivered from various members of the embodiment shown in FIG. 4.

Referring to FIG. 5 showing the timings of signals delivered from various elements of the circuit shown in FIG. 4, when the voltage A of one of the power source lines periodically becomes positive, the output B of the polarity detecting circuit 6, the output C of the serial signal generating circuit 7, and the output G (in current) of the photothyristor 21 are generated as shown in FIG. 5 so that data are serially transmitted from the transmitting circuit to the receiving circuit of the system. The output B of the polarity detecting circuit 6 is generated each time when the voltage A of one of the power source lines becomes positive, and this output B is utilized as a synchronizing signal in this embodiment. More specifically, the output C of the serial signal generating circuit 7 and the output G of the photothyristor 21 are generated in response to the synchronizing signal.

Figure 6:
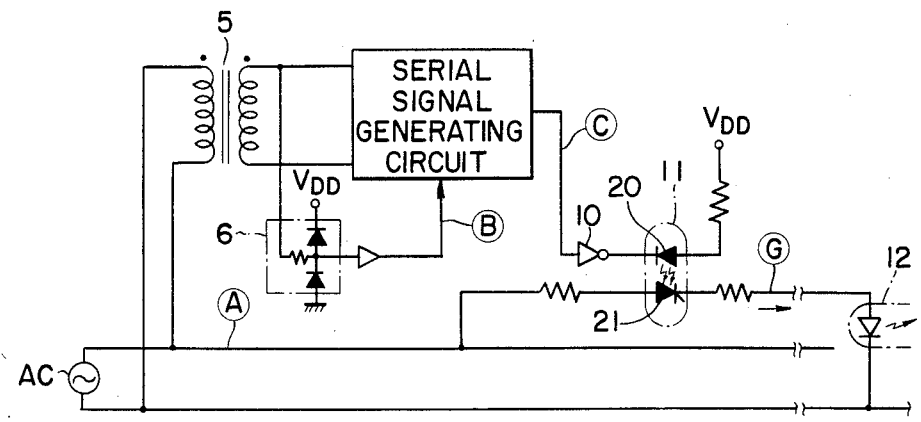
FIG. 6 is a connection diagram showing a case where an AC power source connection in the embodiment shown in FIG. 4 is changed.

FIG. 6 illustrates an example wherein the transformer 5 in the transmitting circuit of the first embodiment is connected reversely to the power source lines.

In this example, differing from that shown in FIG. 5, the output B of the polarity detecting circuit 6 appears when the voltage A of one of the power source lines becomes negative. However, since the way of connection of the photothyristor 21 to the power source lines is similar to that shown in FIG. 4, the output of the photothyristor 21 occurs only when the voltage A of one of the power source lines becomes positive. As a counter measure for the above described phase delay, the output C of the serial signal generating circuit 7 is elongated in excess of one half cycle of the power source voltage.

Figure 7:
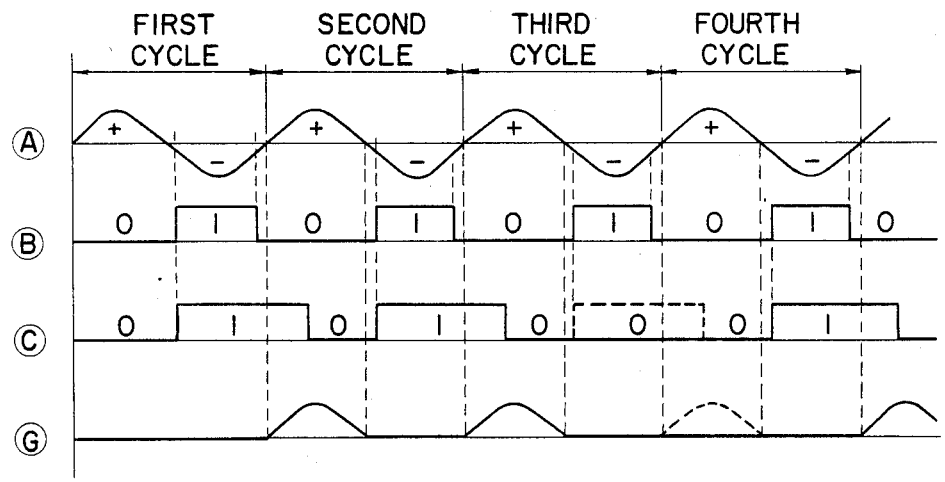
FIG. 7 is a diagram showing waveforms of signals delivered from various members of the embodiment shown in FIG. 6.

As is apparent from FIG. 7, even in a case where the output B of the polarity detecting circuit 6 is delivered when the voltage A of the power source line is negative, the output C of the serial signal generating circuit 7 is elongated to extend from the negative cycle to the positive cycle succeeding thereto of the voltage A, and therefore the output G is delivered from the photothyristor 21 during the positive cycle of the voltage A. It should be noted that the delivery time of the output G in this case is delayed for one cycle period from that shown in FIG. 5.

Figure 8:
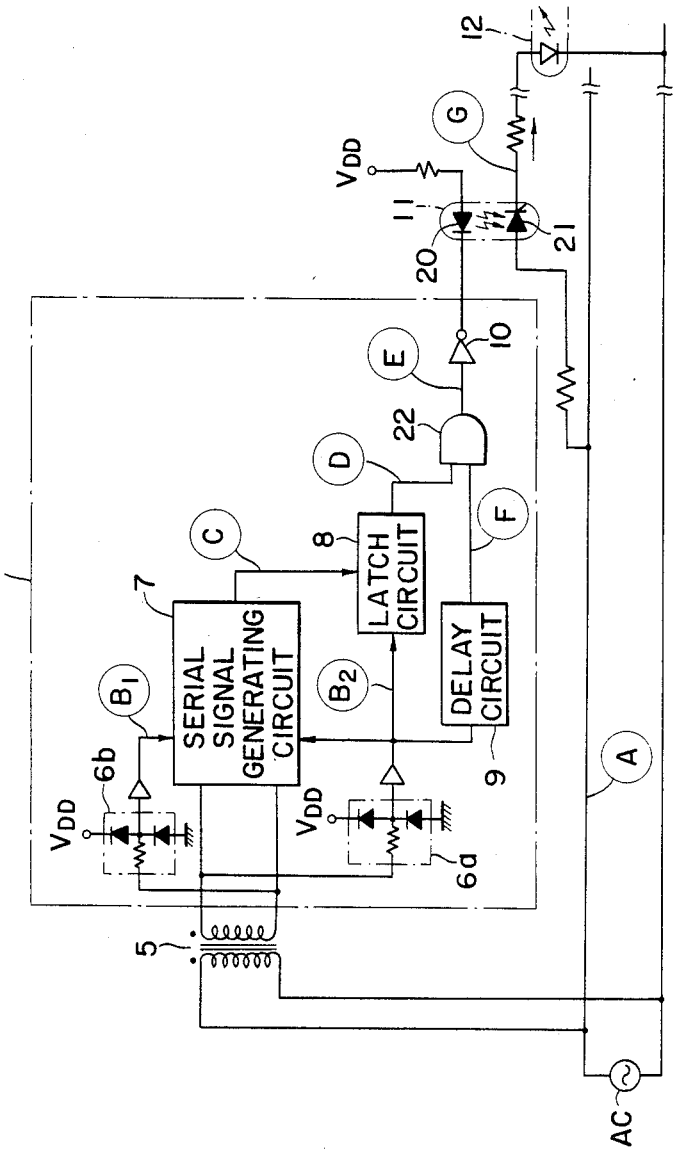
FIG. 8 is a connection diagram showing still another embodiment of the present invention.

FIG. 8 shows another embodiment of the present invention wherein the circuit is made more versatile. In this embodiment, polarity detecting circuits 6a and 6b are provided for detecting polarity of the two power source lines. The output C of the serial signal generating circuit 7 rises up simultaneously with the rising up of the output $B_2$ of the detecting circuit 6a, and falls down simultaneously with the rising up of the output $B_1$ of the detecting circuit 6b. As a result, the output C of the circuit 7 rises up slightly after the voltage A of one of the power source lines has become positive and falls down slightly after the voltage A has become negative. The output C of the serial signal generating circuit 7 is applied to a latch circuit 8 which converts the output C from a half cycle signal into a one cycle signal. The output of the latch circuit 8 is applied to an input terminal of an AND gate 22. Another input terminal of the AND gate 22 is connected to receive the output of delay circuit 9 which elongates the duration of output $B_2$ of the polarity detecting circuit 6a as desired.

Thus, the output E of the AND gate 22 straddles over positive and negative regions of the voltage A in a manner similar to the output F of the delay circuit 9. The output E of the AND gate is inverted by an inverter 10, and applied to a luminous diode of the photocoupler 11 to ignite the luminous diode 11 for an interval of from the positive region to the negative region of the power source voltage A.

The light output from the luminous diode 20 is applied to a photothyristor 21 of the photocoupler 11, and the output G of the photothyristor 21 is utilized for igniting the luminous diode 12 in the receiving circuit of the system. Since the photothyristor conducts only for an interval in which the voltage A of one of the two power source lines is positive, the ignition period of the luminous diode 12 is reduced less than one-half cycle of the power source voltage. The above described relation between the light output from the diode 12 and the polarity of the power source voltage is held constant even in a case where the connection of the transformer 51 to the power source lines is reversed. FIG. 9 is a timing chart showing the above described relation, and it is apparent from FIG. 9 that the transmission is made only when the voltage of one power source line is positive.

In the circuits shown in FIGS. 4, 6 and 8, only a luminous diode 12 is illustrated for the receiving circuit of the system. However, it is apparent that another photothyristor and a serial signal receiving circuit of a well known construction may be provided in the receiving circuit of the serial signal transmission system of the present invention.

We claim:

1. In a serial signal transmission system capable of transmitting serial signals between a transmitting circuit and a receiving circuit of the system, both circuits being supplied with operating power from a commonly provided AC power source, the improvement wherein a signal line is extended from the transmitting circuit to the receiving circuit of the system with one end thereof in the transmitting circuit being connected to a first line of said power source and the other end thereof in the receiving circuit of said line being connected to a second line of the power source, the transmitting circuit of the system comprising means for detecting the polarity of the voltage of the AC power source, means responsive to the output of said polarity detecting means for generating binary pulses, each having a pulse width longer than the duration of a half cycle of the voltage of the AC power source, and a control element which is provided in said signal line and which changes its operative condition upon reception of said binary pulses, to thereby transmit said binary pulses in a serial manner to said receiving circuit of the transmission system.

2. A serial signal transmission system as set forth in claim 1 wherein said means for detecting the polarity of said power source voltage is connected to detect a positive polarity of said power source voltage.

3. A serial signal transmission system as set forth in claim 1 wherein said means for detecting the polarity of said power source voltage is connected to detect a negative polarity of said power source voltage.

4. A serial signal transmission system as set forth in claim 1 wherein said means for detecting the polarity of said power source voltage is so constructed that it delivers a first output each time it detects a positive polarity while it delivers a second output each time it detects a negative polarity, and said means for generating binary pulses is so constructed that it generates binary pulses having a leading rising edge generated upon reception of said first output and a trailing falling edge generated upon reception of said second output.

5. A serial signal transmission system as set forth in claim 1 wherein said control element is a photothyristor contained in a photocoupler, the operative condition of said photothyristor being changed by a light output which is delivered from a luminous diode also contained in said photocoupler upon reception of said binary pulses delivered from said binary pulse generating means.

6. The serial signal transmission system as set forth in claim 1, wherein said means for detecting the polarity of the power source voltage comprises a pair of serially connected diodes with one end grounded and the other end connected to a source of reference DC potential, means for connecting a junction between said diodes to one of said power source lines through a transformer, and means for connecting said junction to said means for generating binary pulses, and wherein said serial signal transmission system is energized from a secondary winding of said transformer.

* * * * *